Oct. 23, 1962 T. V. McNAMARA 3,059,743
AUTOMOTIVE DEVICE

Filed Feb. 20, 1959 3 Sheets-Sheet 1

INVENTOR.
THOMAS V. McNAMARA
BY
Woodhams Blanchard & Flynn
ATTORNEYS

Oct. 23, 1962 T. V. McNAMARA 3,059,743
AUTOMOTIVE DEVICE
Filed Feb. 20, 1959 3 Sheets-Sheet 3

INVENTOR.
THOMAS V. McNAMARA
BY
Woodhams Blanchard and Flynn
ATTORNEYS

3,059,743
AUTOMOTIVE DEVICE

Thomas V. McNamara, Cooper Township, Kalamazoo County, Mich., assignor, by mesne assignments, to Eaton Manufacturing Company, Cleveland, Ohio, a corporation of Ohio
Filed Feb. 20, 1959, Ser. No. 794,567
18 Claims. (Cl. 192—53)

This invention relates to synchronizing mechanism for shiftable elements, such as gears or dog clutches, and it relates particularly to the controlling of synchronization by time responsive means in place of the presently conventional speed responsive means.

In present synchronizing apparatus, it is the frequent practice to provide blocking means opposing the movement of a first set of toothed elements toward a second set of toothed elements which the first set is to engage, and arranging said blocking means in such a manner that is ceases to block interengaging movement of the toothed elements upon the attainment of synchronization therebetween. This has worked well enough in the past where the elements being synchronized are either under relatively light load or have an appreciable period of time to attain synchronization. This is important when it is recognized that the toothed elements are constantly changing speed relative to each other and that the synchronous condition which effects the above-mentioned unblocking is only an instantaneous condition occurring between a pair of rotating toothed elements which are changing speed with respect to each other at a high rate of acceleration or deceleration.

Regardless of the specific details of the equipment being used, there will be some inevitable mechanical lag between the time at which final interengagement of the toothed elements is initiated and the time at which interengagement is actually effected. Thus, with the toothed elements rapidly changing speed with respect to each other, such as at a rate of 600 r.p.m. to 800 r.p.m., only a small fraction of a second after the instant of exact synchronization is required to move said relative speeds sufficiently apart to prevent interengagement of the toothed elements.

Thus, where the apparatus itself possesses a substantial inertia and is further subjected to extremely high loads, such as for highway use by very heavy trucks operating in mountainous terrain or for off the highway use such as by earthmovers, it is very difficult to move the toothed elements toward each other rapidly enough to effect a rake-free interengagement where such movement is not initiated until a synchronous condition exists or is passed.

Further in this connection, if it were not for the presence of blockers, the shift could be completed in many instances somewhat before the point of synchronism. In fact, as set forth at length in the co-pending application Serial No. 569,503, now Patent No. 2,943,502, assigned to the same assignee as the present application, there are actually certain real advantages to be obtained by engaging the engageable teeth at a point slightly ahead of synchronism rather than at a point after synchronism. One of these advantages may be briefly indicated by pointing out that where the rate of change of relative speeds is relatively high, the teeth can be interengaged more readily when the relative rates of rotation of the interengagement of the members are approaching synchronism rather than when they are moving away from synchronism. Thus, means for bringing the interengaging members together at a point slightly ahead of the point of exact synchronism will secure at least two important advantages, namely, further lessening of the time required for the shift and a greater ease of interengagement.

In a further and continuing effort to deal with the problem as above outlined and identified, the present disclosure sets forth an entirely different approach, namely, the use of a time-responsive control for initiating interengaging movement of the toothed elements as distinguished from the previously utilized speed-responsive apparatus.

In addition to the problem above set forth, the use in conventional synchronizing mechanism of any one of the many forms of known blocking structures introduces other problems which have long been recognized to be undesirable, but for which no commercially acceptable solution has previously been offered and hence which have been tolerated.

One of these problems lies in the somewhat erratic performance often experienced with blocker devices. Specifically, the blocker devices include angularly positioned surfaces, often called "ramps," and these ramps are related frictionally to one of the interengaging toothed members. Hence, the angle of the ramp on the blocker must match closely the angle of the cooperating ramp on the toothed member, and this matching is well recognized in prior practice to be quite critical with respect to the ease and effectiveness of operation of the mechanism.

Thus, variations in the precision with which the cooperating surfaces are matched, variations in the lubrication between said surfaces, variations in the smoothness of the surfaces cooperating with each other and other variations in the characteristics of said surfaces affecting their mutual frictional relationship will appreciably affect the operation of the apparatus and tend to make it erratic.

Nevertheless, even where the blocking members have been made with the required accuracy, the wear on said blocking members is often severe and sometimes the wear changes the angle of either or both of said ramps and thereby changes the operating characteristics of the synchronizing mechanism.

A further and specific instance of the desirability of completing a shift without the use of blockers occurs in certain types of transmission utilizing auxiliary units, such as the range shifting transmission shown in the patent of Ludvigsen and Backus, No. 2,637,221. With this mechanism, where an extremely fast shift is being attempted, as on an earthmover or on a heavily loaded truck, the driver may re-engage the clutch upon completion of the hand-operated portion of the shift, namely, the shift in the forward or main transmission, but prior to the completion of the automatic shift occurring in the rear or auxiliary transmission particularly if the shift of the auxiliary transmission is delayed in a given instance by the erratic behavior of the blockers. Such re-engagement of the clutch ahead of interengagement of the teeth of the auxiliary transmission connects the engine through only the synchronizing plates to the driving wheels of the vehicle and results in the immediate destruction of the synchronizing plates. In many such instances a shift at or slightly ahead of the point of synchronism is entirely possible insofar as the interengageable teeth are concerned but is prevented by the existence of blockers.

Therefore, it is desirable to provide apparatus which eliminates the need for blockers and is itself less critical and difficult to control than said blocking mechanisms and this is accomplished by the present invention.

A still further problem, and one which perpetually faces the manufacturer of automotive-type transmissions, is that of space. Transmission manufacturers are constantly under pressure from their customers to provide transmissions having a minimum of axial length and, hence, any improvement by which the axial length of a given transmission can be reduced, even by only a fraction of an inch, is of importance and will often justify extensive re-designing and re-tooling of a given transmission unit. Therefore, mechanism wherein the appreciable axial length of blocking apparatus is eliminated and the function performed thereby is performed by other apparatus which does not require this axial length is of substantial value and this also is accomplished by the present invention.

Accordingly, the objects of the invention are:

(1) To provide shift mechanism for change speed gearing capable of effecting an extremely rapid shift from one ratio to the next.

(2) To provide transmission shifting means, as aforesaid, which will permit shifting of the interengageable parts at, or even slightly ahead of, a condition of exact synchronism between said interengageable parts rather than, as when blockers are used, only at a point after the instant of exact synchronism.

(3) To provide apparatus, as aforesaid, which will minimize the likelihood of damaging the transmission synchronizers which sometimes results in automatic equipment from re-imposition of the load through the transmission prior to completion of the shift.

(4) To provide shift mechanism for a change speed gearing including means for (1) preventing shifting while (2) simultaneously effecting synchronization by engagement of a progressively engageable, such as frictional, device and (3) maintaining such engagement for a measured period of time sufficient that synchronization can take place and then (4) substantially simultaneously releasing said engagement and urging said shiftable parts into engagement with each other.

(5) To provide shifting apparatus, as aforesaid, for a change speed gearing in which the period of synchronization is solely responsive to the timing-out of a time responsive device.

(6) To provide shifting means for a change speed gearing whose action will be positive and definite and under exact control throughout the entire shifting operation.

(7) To provide pressure fluid shifting apparatus for a transmission in which pressure fluid may be applied to the apparatus for effecting the next shift to be made and including shift preventing means preventing engagement of the toothed elements in response to said pressure until the toothed elements to be engaged have reached a predetermined condition of synchronization.

(8) To provide a device wherein the next shifting operation is pre-energized but the shifting movement is blocked until the toothed elements to be engaged have reached a desirable and predetermined condition of synchronization. When such condition is reached, the blocking condition is removed and the parts will then move with a minimum time requirement into the next shifted position.

(9) To provide shift initiating apparatus, as aforesaid, which is responsive to time-sensitive control apparatus for determining the time during which the synchronizing elements shall be engaged.

(10) To provide shift initiating apparatus, as aforesaid, which will eliminate the previously commonly known blocking elements, thereby making available for other use the space previously occupied by such blocking elements.

(11) To replace the somewhat erratic operation often characteristic of blocking elements with a more certain and reliable operation and particularly to provide means whose characteristics of operation will be less responsive to changes in the apparatus resulting from ordinary wear thereof.

(12) To provide a transmission synchronizing apparatus which will be relatively economical to fabricate and to maintain in good operating condition and yet which will permit an extremely rapid shifting movement of toothed elements with extremely closely, and often substantially perfectly, matched synchronization of the interengaging toothed elements.

(13) To provide apparatus of the type aforesaid which will be positive and reliable in operation, which will be rugged, and which will not require excessive maintenance.

Other objects and purposes of the invention will become apparent to persons acquainted with apparatus of this general sort upon reading the following disclosure and inspection of the accompanying drawings.

Referring to the drawings.

IN GENERAL

In general, the objects of the invention are accomplished by providing progressively engageable, such as frictional, synchronizing clutches between the interengageable parts, such as, for example, the shiftable toothed elements of a transmission, and further providing pressure fluid responsive means for effecting engagement of said synchronizing clutches. A fluid pressure system supplies said pressure fluid responsive means and is fitted with control devices such that pressure fluid is introduced into said pressure fluid responsive means for effecting engagement of one of said synchronizing clutches at some selected point or position following disengagement of the previously engaged toothed elements, such as upon the attainment of neutral position by the transmission mechanism being shifted, while simultaneously activating a blocking device and initiating a time-controlled controlling mechanism. Upon the timing-out of said last-named mechanism, the engaged one of said synchronizer clutches is released, the blocking device deactivated and interengagement of the toothed elements is immediately effected.

The time function of said time-controlled means is set for a period of time sufficient to insure substantial synchronization of the interengageable parts which are to be engaged with each other prior to the release of said blocking device and completion of interengaging movement of the toothed elements.

By using synchronizing clutches having a substantial capacity, the time required for effecting such synchronization is measurable in terms of a small fraction of a second and is of sufficiently constant nature that it need not be excessive in order to insure synchronization of the interengageable elements. This follows particularly since one of the interengageable elements will normally be running free due to the opening of a further clutch located between the transmission and either the driving or driven means associated with said transmission.

Detailed Description

Figures 1, 5, 6:
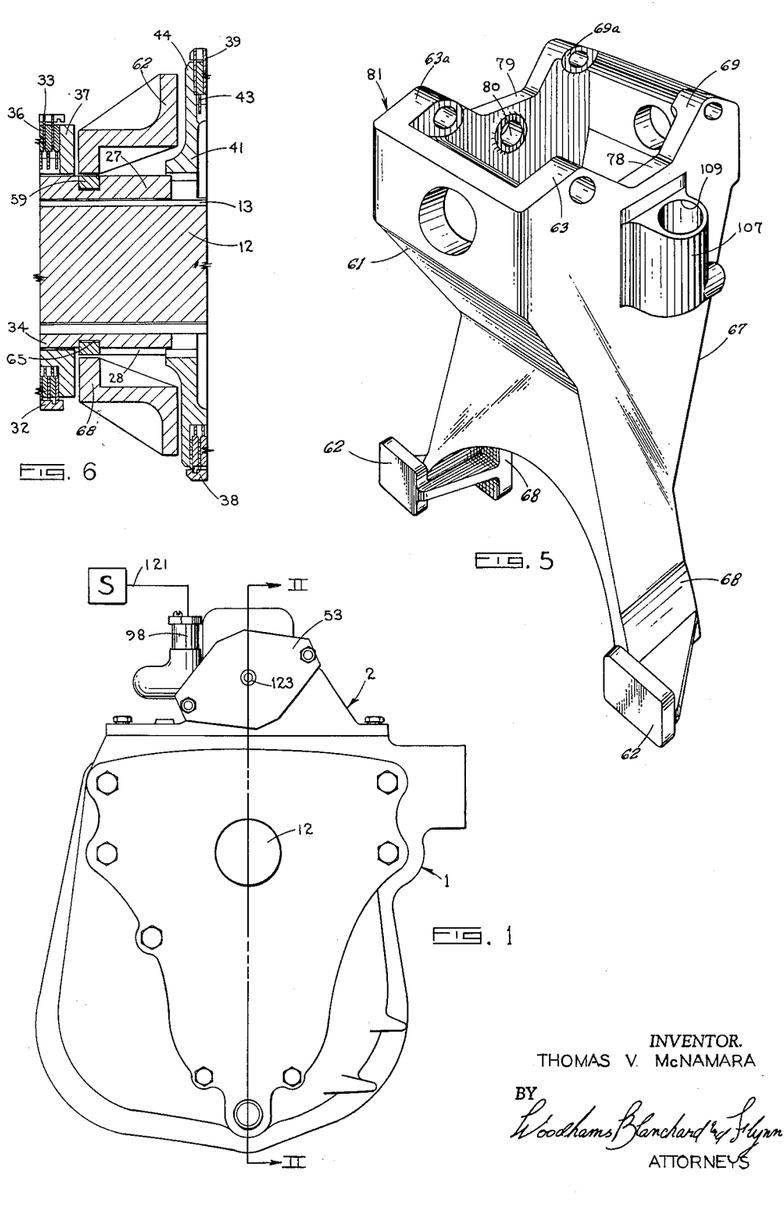
FIGURE 1 is an end elevational view of a typical transmission embodying the invention.
FIGURE 5 is an oblique view of the shifting fixture included in the invention.
FIGURE 6 is a sectional view taken along the line VI—VI of FIGURE 2.
Figure 2:
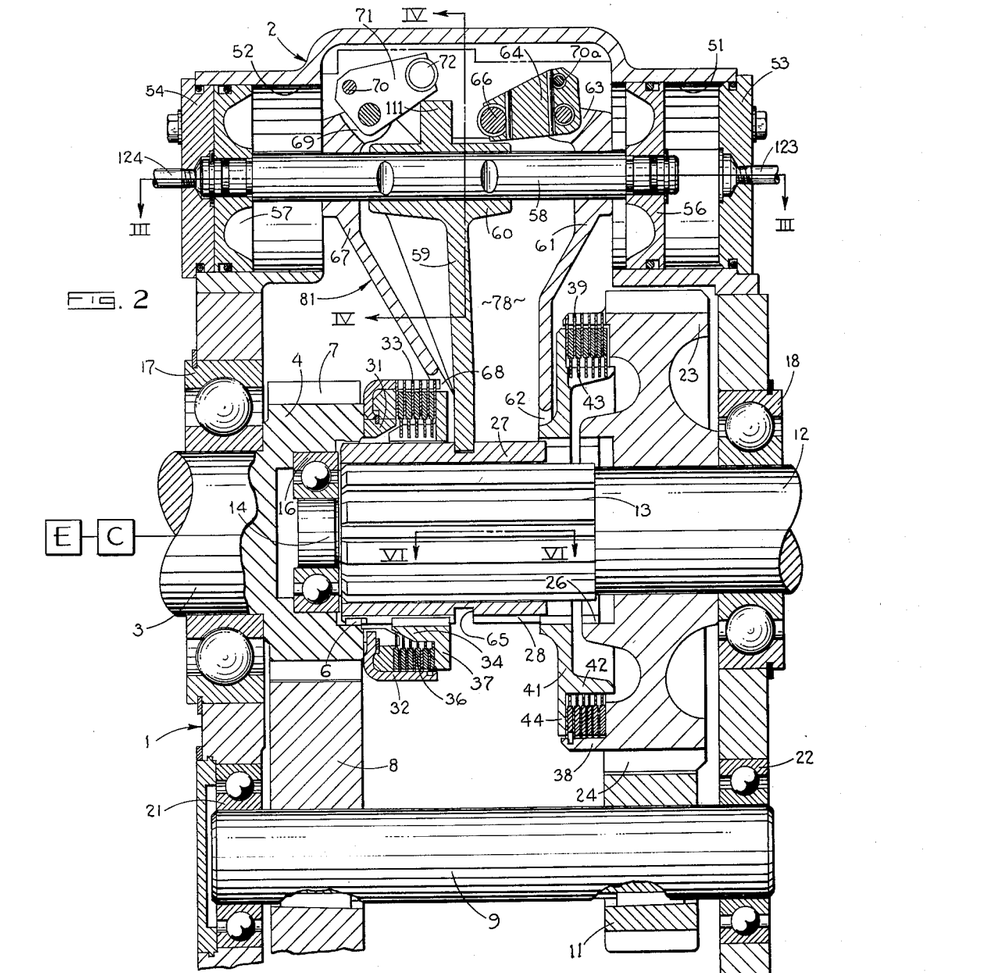
FIGURE 2 is a sectional view substantially as taken along the line II—II in FIGURE 1.

For convenience in description and with no intention to limit, the terms "upward," and "downward" and terms of similar import and derivatives thereof will refer to directions with respect to the apparatus in its normal position of use which in this embodiment may be taken for the purpose of such reference as the position shown in FIGURES 1 and 2. The term "rightward" and "leftward" and words of similar import and derivatives thereof shall be taken with reference to the drawings as appearing in the particular figure in connection with which said terminology is used and when no specific figure is indicated then it shall be taken in connection with the apparatus as appearing in FIGURE 2. The terms "inner," "outer" and derivatives thereof will have reference to the geometric center of said transmission and parts thereof.

Referring now to the parts of the drawings in more detail (FIGURE 2), there is shown an upwardly opening lower housing 1 which is closed by an upper housing 2. The lower housing contains the gear and synchronizer mechanism and the upper housing contains the control mechanism associated therewith.

Referring now to the parts within the lower housing 1, there is shown a first shaft 3, which for illustrative purposes hereinafter will be considered as, and termed, the "input" shaft, upon the end of which is formed an enlarged head or input gear 4 having internal dog clutch teeth 6. The gear 4 may also have external teeth 7 for connection if desired to another gear system, such as the gear 8 connected through a countershaft 9 to a gear 11.

A second shaft 12, which for illustrative purposes will hereinafter be termed the "output" shaft, is arranged coaxially with the input shaft 3. Said output shaft 12 is formed with a splined portion 13 and has its leftward end 14 supported upon a suitable bearing 16 within the rightward end of the input shaft 3.

The rightward end of the input shaft 3 is supported as convenient upon a conventional bearing 17, the output shaft 12 is supported at its rightward end as convenient upon a conventional bearing 18, and the countershaft 9 is supported as convenient upon bearings 21 and 22. A gear 23 is mounted on and in rotatable relationship with the output shaft 12 and is provided with external teeth 24 engaging with the teeth of the gear 11. Said gear 23 is further provided with internal dog clutch teeth 26 for purposes appearing hereinafter.

Encircling the splined portion 13 of the output shaft 12 (FIGURE 2) is a sleeve 27 which is arranged for axial movement along said shaft 12 but by virtue of its interengagement with said splines is non-rotatable with respect to said shaft. External dog clutch teeth 28 are formed on said sleeve for engagement with the dog clutch teeth 6 when said sleeve is in its leftward position as shown in the drawing or for engagement with the dog clutch teeth 26 when said sleeve is in its rightward position.

The synchronizing structure may be of any known progressively engageable form but is here for illustrative purposes shown as a friction synchronizer of the type utilizing interleaved plates. In the structure here shown, a support 31 is secured to and extends rightwardly from the rightward end of the gear 4 of the input shaft 3 and supports an annular bracket 32 upon which are supported a plurality of plates 33. Said plates are of known construction and in this embodiment they are arranged upon said bracket 32 for axial movement with respect to the input and output shafts 3 and 12 but are arranged non-rotatably with respect to the bracket 32. A further annular bracket member 34 is supported on the external clutch teeth 28 of the sleeve 27 for axial movement with respect thereto but said bracket 34 is held by the teeth 28 against rotatable movement with respect to said sleeve. Said bracket 34 supports a plurality of friction plates 36 which are interleaved with the friction plates 33 and are mounted on the bracket 34 in such a manner that they will slide axially with respect thereto but are held against circumferential movement with respect thereto. The radially extending flange 37 forms a part of the bracket 34 for reasons appearing hereinafter, but is constructed in such a manner, according to known practices, that the leftward pressure applied to said flange 37 will effect the tightening of the interleaved plates 33 and 36.

An annular flange 38 (FIGURE 2) is secured to and extends leftwardly from the leftward face of the gear 23 and supports a plurality of friction plates 39, said plates 39 being supported on said bracket in such a manner that they can move axially with respect thereto but are held against circumferential movement with respect thereto. An annular bracket 41 is mounted on the rightward end of the sleeve 27 and is arranged thereon in such a manner that it can move axially with respect thereto but is held against circumferential movement with respect thereto. Said bracket 41 has a portion 42 supporting a plurality of friction plates 43 which are interleaved with the friction plates 39, said plates being supported on a portion 42 in such a manner as to permit axial movement with respect thereto but to be held against circumferential movement with respect thereto. Said bracket 41 also has a radially extending flange 44 for purposes appearing hereinafter but so arranged that rightward pressure applied to said flange will effect rightward movement of the bracket 41 and thereby a tightening of the interleaved plates 39 and 43.

Turning now to the upper housing 2 (FIGURES 2 and 3) a pressure cylinder 51 is formed in the rightward end thereof and another pressure cylinder 52 is formed in the leftward end thereof. A closure plate 53 is fastened in any suitable manner to close the rightward end of cylinder 51 and a closure plate 54 is provided in a similar manner to close the left end of the cylinder 52. A piston 56 is reciprocably arranged within the cylinder 51 and a similar piston 57 is reciprocably arranged within the cylinder 52. A rod 58 rigidly connects said pistons and a fork 59, which is rigidly supported by a head 60 on said rod, extends downwardly to engage the external groove 65 which is located in the sleeve 27. Thus, axial movement of the rod 58 is transmitted to, and effects axial movement of, the sleeve 27.

A rightward pressure member 61 (FIGURE 2), which is preferably part of the fixture 81 (FIGURE 5), is supported slidably on the rod 58 (FIGURE 2) and is located near the rightward end thereof. An extension 62 extends downwardly from the member 61 and is aligned with the flange 44 (FIGURE 6) such that rightward movement of the pressure member 61 will effect rightward movement of the bracket 41 and thereby effect an interengagement of the frictional plates 39 and 43. The pressure member 61 also has upwardly extending lugs 63 and 63a (FIGURE 3) on and between which the actuator 64 is pivotally supported. A roller 66 is rotatably mounted in any convenient manner in the leftward end of the actuator 64.

A further pressure member 67 (FIGURE 2), which is also preferably part of the fixture 81 (FIGURE 5) is slidably supported on the rod 58 (FIGURE 2) near the leftward end thereof and is provided with a depending portion 68 which extends to a point adjacent the flange 37 (FIGURE 6) such that leftward movement of the pressure member 67 will effect leftward movement of the bracket 34 and thereby effect a frictional engagement of the frictional plates 33 and 36. The upper part of the pressure member 67 (FIGURE 3) is provided with lugs 69 and 69a upon and between which is pivotally supported an actuator 71, and which may be similar to actuator 64. Said actuator 71 supports a roller 72 rotatably at its rightward end. Pins 70 and 70a extend sidewardly from the actuators 71 and 64, respectively, and between them extends a spring 73 (FIGURE 3) to provide a constant urging of the actuator 64 in a counterclockwise direction and the actuator 71 in the clockwise direction.

Figure 7:
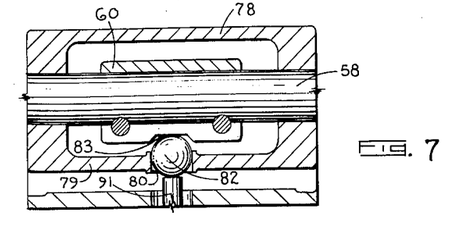
FIGURE 7 is a sectional view taken along the line VII—VII in FIGURE 4.

The fixture 81 in the specific embodiment herein illustrated includes as integral parts the pressure members 61 and 67, as best shown in FIGURE 5. Thus, said pressure members are rigidly held with respect to each other so that movement of one thereof for tightening the friction plates (FIGURE 2) associated therewith will positively effect movement of the other thereof to insure that no pressure is exerted on the other friction plates. The side 79 (FIGURE 3) of the fixture 81 is provided with an opening 80 (FIGURE 4) within which is supported a ball 82. Said ball is arranged for cooperation with a groove 83 (FIGURE 7) in the head 60.

A plunger 91 (FIGURE 4) is arranged within a cylinder 92 and is backed by a spring 93 for normally holding said plunger in its inner (rightward) direction. A groove 94 in said plunger 91 receives a ball 96 against which acts a plunger 97 which actuates a valve 98. Thus, when the parts are in the position shown in FIGURE 4, the plunger 97 is in its downward position and the valve 98 is closed. However, when the ball 82 moves rightwardly in response to urging of the spring 93, which occurs when the rod 58 is in its centered position and the gears within the lower housing 1 are in their neutral position, the valve 98 is then opened.

Figure 3:
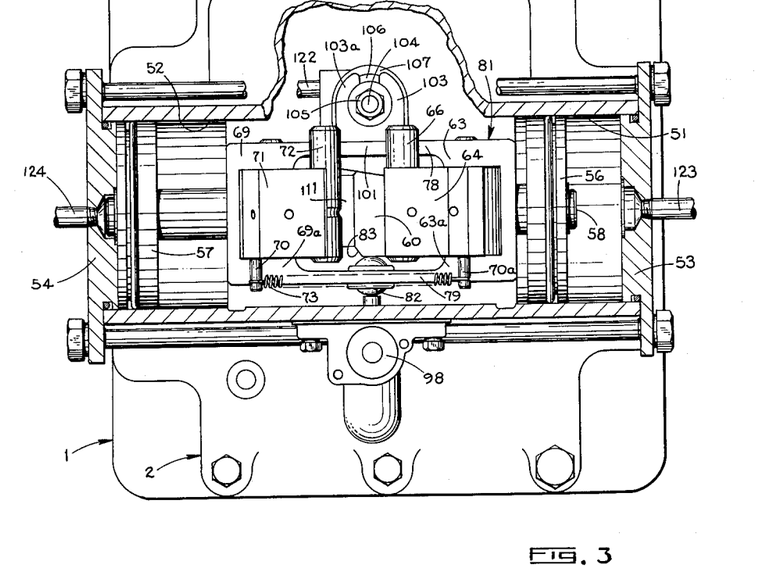
FIGURE 3 is a broken sectional view substantially as taken along the line III—III in FIGURE 2.
Figure 4:
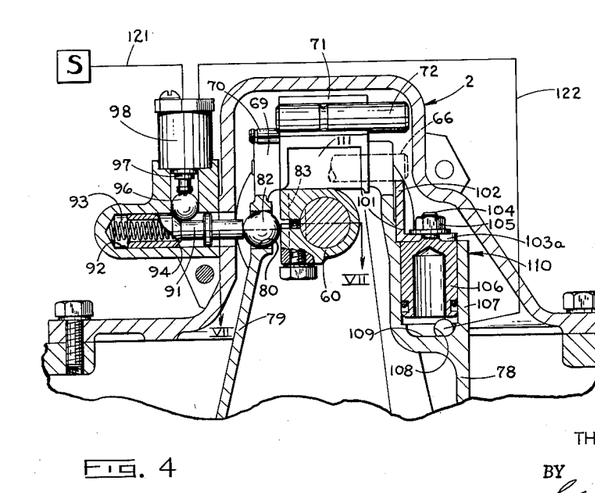
FIGURE 4 is a sectional view substantially as taken along the line IV—IV of FIGURE 2.

Within the rightward side of the upper housing 2 (as appearing in FIGURE 4) is located an angle member 101 whose upwardly extending flange 102 is arranged to engage the rollers 66 and 72 (FIGURE 3). Said angle member has lower portions 103 and 103a extending on either side of a screw 104 which is engaged by a nut 105 holding said member 101 snugly against a timer 110. Said timer 110 includes a plunger 106 which is received within a cylinder 107 into which pressure may be introduced through an opening 108. The cylinder 107 is in turn mounted, integrally or otherwise, on a suitable portion of the fixture 81, such as on the side 78 thereof opposite the location of the ball 82. When said pressure is introduced into cylinder 107, said plunger moves upwardly and effects upward movement of the angle member 101 which engages the rollers 72 and 66 and moves them upwardly.

An upwardly extending abutment 111 (FIGURES 2 and 3) is affixed to the head 60 on the fork 59 and is positioned in horizontal alignment with the rollers 66 and 72 in such a manner that when said rollers are in a downward position, as is the roller 66 in FIGURE 2, axial movement of the rod 58 toward a roller in the downward position will cause said abutment 111 to engage said roller and effect axial movement of that one of the pressure members 61 or 67 toward which the rod 58 is moving. Thus, in the arrangement appearing in FIGURE 2, rightward movement of the rod 58 will cause the abutment 111 to act against the roller 66 and thereby cause rightward movement of the pressure member 61.

Preferably the axes of the rollers 66 and 72 will be slightly below a plane defined by the pivot axes of the actuators 64 and 71 in order to lock said actuators in the downward position when the abutment 111 moves into engagement with their respective rollers.

The pressure source "S" (FIGURES 1 and 4) may be of any convenient standard type and may involve any kind of pressure fluid (including vacuum) but will herein be considered to refer to compressed air for purposes of illustration. Said pressure source is connected through a conduit 121 (FIGURE 4) to the inlet of the valve 98. The outlet of said valve is connected by a conduit 122 to the inlet opening 108 of the cylinder 107. The cross-sectional area of the opening 108 bears a very precise relationship to the volume of the chamber 109, whereby under the pressure at which the system is operating in a given instance the time required for moving the plunger 106 upwardly will be precisely controllable. The same or different pressure source, as convenient, is connected through the fittings 123 and 124 to the cylinders 51 and 52, respectively, for actuation of the pistons located therein in response to the shift controls in the usual manner and by means which may be conventional and are not detailed herein.

*Operation*

For the purpose of specific illustration and with no intention to limit the applicability of the apparatus herein described to other than a wide variety of particular circumstances and uses, it will be assumed that the apparatus herein specifically described is being utilized as a two-speed transmission for an automotive device utilizing a driving clutch "C" between the engine "E" thereof and the input shaft 3 of the transmission herein described. The output shaft 12 is connected to the road wheels (not shown). A still further specific example of such use is to consider the apparatus herein disclosed and described as the range shifting portion of a range shifting type of transmission, such as the auxiliary box 11 shown in the United States Letters Patent No. 2,637,221 issued to Ludvigsen and Backus.

At the commencement of one shifting operation of the apparatus herein shown, pressure fluid is introduced through the fitting 124 into the leftward end of the cylinder 52. The initiation of such flow of pressure fluid may be by any convenient means, not herein shown, which means may be of the type fully shown in connection with said range shifting gears of Patent No. 2,637,221. This urges the piston 57, hence the rod 58, rightwardly, which operates through the fork 59 to effect rightward movement of the sleeve 27. This disengages the external dog clutch teeth 28 of said sleeve from the internal dog clutch teeth 6 of the input gear 4. Immediately upon the disengagement of the dog clutch teeth 28 from the dog clutch teeth 6, the groove 83 becomes aligned with the ball 82 (FIGURE 7) and permits both the ball 82 and plunger 91 to move inwardly in response to urging of the spring 93. This moves the ball 96 upwardly and opens the valve 98. Opening of the valve 98 commences introduction of pressure fluid through the port 108 into the cylinder 109 of the timer 110. The rightward movement of the rod 58 which initiates operation of valve 98 also permits the abutment 111 to move out from under the actuator 71 so that both actuators 71 and 64 are in their downward position and at the same time the transmission is in neutral.

Continued movement of the rod 58 rightwardly, under the urging of pressure fluid in cylinder 52, causes the abutment 111 to engage the roller 66 and, acting through the actuator 64, to urge the pressure member 61 rightwardly. This causes the depending portion 62 to engage the bracket 41 and thereby effect frictional engagement of the interleaved frictional plates 39 and 43 and thereby initiate synchronization of the sleeve 27 (and consequently, the output shaft 12) with the internal dog clutch teeth 26 of the gear 23. Inasmuch as the friction plates 39 and 43 are receiving the full pressure of the pressure fluid acting on the leftward side of the piston 57 and since said plates are of substantial size, the shaft 12 and the gear 23 will be brought into synchronization very quickly, namely, within a small fraction of a second in a usual case. Further, since the driving clutch C, which is located between the power source and the input shaft 3, is open, there is very little load on the gear 23 and this further facilitates the very rapid synchronization of the parts. Still further, since the mass of the parts between said driving clutch and the gear 23 is constant in all instances, the time required for effecting synchronization will in all instances be relatively constant, or at least sufficiently so that by using very large synchronizing plates 39 and 43, the parts can be synchronized in all cases within a relatively small fraction of a second, as one-tenth of a second. Therefore, if the cylinder 109 will fill with pressure fluid to a predetermined pressure, namely, to a pressure sufficient to lift the angle member 101, within a predetermined fraction of a second representing a time period slightly greater than that required for synchronization as above set forth, this latter time can also be regulated with great accuracy and held to a small fraction of a second and yet it will in all cases be not less than the period of time required for synchronization of the gear 23. For example, it is entirely feasible to effect synchronization of the gear 23 and the shaft 12 in all normal instances of operation of the vehicle in which the transmission is utilized in approximately one-fifth of a second. In such case, the chamber 109 will be caused to become pressurized in approximately one-fourth or one-third of a second although in view of the time lag involved in the actual response of the mechanical parts to the attainment of a predetermined pressure within the chamber 109, it will be permissible for the chamber to become pressurized in as little as one-fifth of a second without difficulty since said time lag will provide a sufficient margin of safety to make sure that synchronization has actually taken effect before the commencement of the remainder of the operation. It is, of course, apparent that when synchronization is achieved, the synchronizing clutch will continue to hold the parts in synchronization with each other until the timer times out so that there is no possibility of over-synchronizing the interengageable parts.

As the timer 110 times out, resulting in this embodiment in the chamber 109 being properly pressurized, the hollow plunger 106 moves upwardly and causes the angle member 101 to engage and raise both of the rollers 66 and 72 so that the centerlines of said actuator rollers are above the single plane defined by both of the pivot axes of the actuators 64 and 71. The resultant upward movement of the adjacent ends of the actuators 64 and 71 is opposed by spring 73 which is stretched by such movement. Upward movement of the actuator 64 is also opposed by the locking engagement between the roller 66 and the abutment 111. That is, when actuator 64 is in its downward position, the roller is slightly rightward of its maximum leftward position in its path around the pivot axis of the actuator. Thus, the abutment 111 must be moved slightly leftwardly, against the contrary urging of the piston 57, before the actuator 64 can be moved upwardly. The time-out pressure within the timer 110 is sufficient to overcome the urging of the piston 57 and the spring 73.

As soon as the roller 66 is moved above the plane of the pivot axes of said actuators, even though only slightly, the forces produced by the timer 110 and the piston 57 commence to cooperate and thereby suddenly snap the actuator 64 upwardly above the abutment 111 where it will cease to obstruct the rightward movement of the abutment. Simultaneously, the pressure against the rightward pressure member 61 is released and hence the frictional engagement between the plates 39 and 43 is released. This permits the dog clutch teeth 28 and 26 to shift slightly circumferentially relative to each other if needed to avoid interference which would otherwise occur if said teeth happened to be unaligned at least partially with each other and were held in such position by engagement of the synchronizing clutch plates 39 and 43. The pressure of the leftward side of the piston 57 being at all times continuous, rod 58, and the fixture 81 carried on and by said rod, are now permitted to resume their rightward movement and they do so immediately upon the raising of the actuator 64 above the abutment 111. This happens so quickly that there is no time for the dog clutch teeth 28 and 26 to get out of synchronization with respect to each other prior to their inter-engagement with each other.

Thus, since the external teeth 28 of the sleeve 27 are now synchronized with the internal teeth 26 of the gear 23, the shift will be completed smoothly and without clashing of said teeth.

Such further rightward movement of the rod 58 will move the groove 83 out of alignment with the ball 82 and thereby move the plunger 91 outwardly and permit the ball 96 to move downwardly and thereby close the valve 98. The chamber 109 thereby exhausts to the atmosphere and the spring 73 acts through the roller 72 upon the angle member 101 whereby the parts of the timer 110 are returned to their "at rest" condition. The cylinder 52 is de-energized by external control means not here shown and the shift is complete.

Where the sleeve 27 moves in the leftward direction, the series of movements resulting therefrom is substantially similar to that above described. In this instance the pressure fluid is introduced into the chamber 51 on the rightward side of the piston 56 to effect leftward movement of the rod 58. This causes the abutment 111 first to disengage the pressure member 61 and then engage the roller 72, and thereby urge the pressure member 67 and its depending portion 68 to effect engagement of the synchronizer plates 33 and 36. Simultaneously the ball 82 is again permitted to move into the groove 83 whereby to introduce pressure fluid into the chamber 109. Upon the pressurizing of said chamber, during which time synchronization between the teeth 6 of the gear 4 and the teeth 28 of the sleeve 27 has been completed, the angle member will again move upwardly and thereby lift the rollers 66 and 72 until the actuator 71 is snapped above abutment 111 to permit continued leftward movement of the rod 58. This effects inter-engagement of the teeth 28 with the teeth 6 and the leftwardly shifting movement is completed.

By eliminating the blocker members which would otherwise be used in conjunction with the synchronizing plates, sufficient additional room is obtained without increasing the overall length of the tranmission unit to enable the synchronizing plates to be made of very large capacity. This increases the speed at which synchronizing is effected to such a point that synchronization and consequent shifting of the shiftable elements may be accomplished very quickly. Further, since the shifting operation after synchronization is initiated is under a time control which has nothing to do with the relative speeds of the shiftable parts, and since the shiftable parts themselves are firmly locked together, where relatively large synchronizing clutches are used, the shift will be completed without any clashing of the toothed elements. This, then, makes possible an extremely smooth and rake-free shifting operation even where the transmission is being utilized under heavy loadings, such as encountered by very heavy highway equipment operating in a mountainous terrain or off the road equipment, such as heavy earthmovers.

Although a particular preferred embodiment of the invention has been disclosed above in detail for illustrative purposes, it will be understood that variations or modifications of such disclosure, which lie within the scope of the appended claims are fully contemplated.

What is claimed is:

1. In synchronizing apparatus for a pair of interengageable toothed elements, comprising in combination: frictionally engageable synchronizing means associated with said toothed elements for frictionally effecting synchronization thereof power means which, when actuated, continuously urges said toothed elements into interengagement; means urging said synchronizing means into frictional engagement with each other upon approach of said interengageable toothed elements toward each other; timing means for timing a predetermined time period and means initiating operation of said timing means in a predeterminable timed relationship with the engagement of said synchronizing means, said timing means being otherwise operable independently of said synchronizing means; blocking means for preventing movement of said toothed elements into interengagement during said time period and means responsive to timing out of said timing means for disengaging said frictionally engageable synchronizing means and for removing said blocking means so that said power means effect interengagement of said interengageable toothed elements.

2. An apparatus for effecting a driving engagement between a pair of toothed elements rotatable about a common axis, one of said elements being movable along said axis toward the other element for effecting engagement therebetween, comprising: synchronizing means engageable with said toothed elements; first pressure fluid operated means for effecting said movement of said one toothed element; actuating means engageable by said fluid operated means during said movement thereof for operating said synchronizing means and blocking means for temporarily blocking further movement of said first pressure fluid operated means; second pressure fluid operated means operable independently of said first fluid pressure operated means and said actuating means for disengaging said first pressure fluid operated means from said actuating means at a predetermined time after engagement therebetween and for releasing said blocking means whereupon engagement between said toothed elements is effected.

3. Apparatus for effecting a driving connection between a pair of toothed elements rotatable with respect to each other about a common axis, one of said elements being movable along said axis into toothed engagement with the other element, comprising: frictional synchronizing means between said toothed elements; a first pressure fluid operated means for continuously urging movement of said one element toward the other element until the engagement therebetween is completed; actuating means engageable by said first pressure fluid operated means during said movement of said one element toward the other element and prior to engagement between said elements for operating said synchronizing means; blocking means operable with said actuating means for blocking further movement of said one element toward said other element; second pressure fluid operated means for releasing said synchronizing means and for removing said blocking means; and control means responsive to the initial movement of said one element toward the other element for initiating flow of pressure fluid to said second pressure fluid operated means, said control means being otherwise operable independently of said first fluid pressure operated means, said actuating means and said blocking means, said flow being at a predetermined rate whereby said releasing takes place at a selected time after said synchronizing means and said blocking means are operated, such time being after said elements are synchronized.

4. Apparatus for effecting a driving connection between a clutch sleeve and the clutch teeth on a gear coaxially rotatable with respect to said sleeve, said sleeve being movable along said axis toward and away from said gear, comprising: first pressure fluid operated shift means engageable with said sleeve for effecting said movement thereof; frictional synchronizing means connected between said sleeve and said gear; an actuating device engageable by said shift means during movement thereby of said sleeve toward said gear for operating said synchronizing means prior to engagement of said sleeve with said clutch teeth, said actuating device including blocking means engageable with said shift means for blocking further movement thereof while said synchronizing means is operating; second pressure fluid operated means effecting disengagement between said shift means and said actuating device and said blocking means at a selected time after engagement therebetween and after synchronization of said sleeve and said gear, said shift means thereafter effecting engagement of said sleeve with said clutch teeth; and control means for directing a flow of pressure fluid to said second pressure fluid operated means approximately when said shift means engages said actuating device.

5. The structure of claim 4 wherein said pressure fluid operated shift means includes a shift fork connectible to a piston disposed within a piston chamber for movement in a direction parallel with the common axis of said sleeve and said gear; and wherein said control means includes a valve operated by said shift means for connecting a source of pressure fluid to said second pressure fluid operated means.

6. The structure of claim 4 wherein said actuating means includes a pivotally supported lever engageable by said shift means for moving said actuating means into the operating position with respect to said synchronizing means; and wherein said second pressure fluid operated means is arranged for pivoting said lever to effect disengagement of said lever from said shift means at a predetermined time after the initial engagement therebetween.

7. The structure of claim 6 wherein said synchronizing means includes a plurality of first friction plates rotatable with said gear and a plurality of second friction plates interleaved with said first friction plates and rotatable with said sleeve, said actuating means being arranged to compress said first and second plates together.

8. An apparatus for changing the gear ratio in a transmission having a pair of spaced gears coaxial with, and drivingly connectible, one at a time, with a dog clutch member disposed therebetween, the combination comprising: a pair of friction synchronizers, one being connected between each of said gears and said clutch member; first pressure fluid operated shift means for effecting movement of said dog clutch member into and out of engagement with said gears, one at a time; actuating means for operating one of said synchronizers at a time in response to movement of said dog clutch member toward said one synchronizer and prior to engagement between the corresponding gear and said dog clutch member, said actuating means including blocking means engageable with said shift means for blocking movement thereof when one of said synchronizers is operating; second pressure fluid operated means for effecting disconnection between said dog clutch member and said actuating means and said blocking means at a selected time after the initiation of said synchronization and after such synchronization is complete, whereby said shift means moves said clutch member into engagement with said associated gear; and control means for directing a flow of pressure fluid to said second pressure fluid operated means upon the occurrence of a preselected movement of said dog clutch member.

9. Apparatus for effecting a driving connection between a pair of toothed elements rotatable with respect to each other about a common axis, one of the elements being movable along said axis into toothed engagement with the other element, comprising: a friction synchronizing clutch between said toothed elements; a fluid pressure operated shift rod; a shift fork mounted on said shift rod for movement therewith; friction clutch operating means movable with respect to said shift rod and mounted for operating said friction clutch; linkage means between said shift rod and said operating means and movable between a first position wherein it connects said shift rod to said operating means so that said clutch is applied and further movement of said shift rod is blocked and a second position wherein said shift rod is movable with respect to said operating means; timing means for moving said linkage from its first to its second position a predetermined time after initiation of the operation thereof; means for continuously urging said shift rod in a direction to cause driving engagement of said toothed elements; and means responsive to a predetermined movement of said shift rod for initiating operation of said timing means whereby said shift rod is moved a predetermined distance with said linkage in said first position to thereby effect operation of said synchronizing clutch and after a predetermined time said linkage is moved to its second position and said toothed elements are brought into engagement.

10. Apparatus according to claim 9 wherein said operating means is adjacent one end of said shift rod and said linkage comprises a lever pivotally mounted on said operating means and extending therefrom toward the other end of said shift rod; means on said shift rod engageable with said lever when same is in said first position so that said lever blocks further movement of said shift rod, said lever being pivotable to said second position wherein it permits further movement of said shift rod.

11. Apparatus according to claim 9 wherein said timing means is a chamber and means movable in response to pressurizing of said chamber for moving said linkage from its first to its second position a predetermined time after pressure fluid is first supplied to said chamber; a source of pressure fluid for said chamber; a valve between said source and said chamber; operating means for said valve carried by said shift rod for opening said valve after predetermined movement of said shift rod to thereupon supply pressure fluid to said chamber.

12. Apparatus for effecting driving connection between a clutch sleeve and clutch teeth on a gear coaxially rotatable with respect to said sleeve, said sleeve being movable along said axis toward and away from said gear, comprising: a friction synchronizing clutch comprising axially movable interleaved plates connected alternatingly to said gear and said clutch sleeve; a fluid pressure operated shift rod movable parallel with said axis; a shift fork mounted on said shift rod and connected to said sleeve, said shift rod having an up-standing abutment thereon; a friction clutch operating plate slidably mounted on said shift rod and extending adjacent said plates so that axial movement thereof into engagement with said plates effects frictional engagement therebetween; a lever pivotally mounted on said operating plate and being movable between a first position where it extends substantially parallel with said shift rod and is engageable with said abutment and a second position where it is inclined and is not engageable with said abutment; means for normally placing said lever in said first position wherein further movement of said shift rod toward said plate is blocked and said plate holds said friction clutch engaged; a chamber and means movable within said chamber upon pressurizing thereof and engageable with said lever a predetermined time after pressure fluid is first applied to said chamber; means responsive to predetermined movement of said shift rod for effecting supply of pressure fluid to said chamber whereby said shift rod is moved so that the abutment thereon engages said lever and the friction clutch is engaged and after a predetermined time said lever is moved to its second position, the friction clutch is disengaged and said clutch sleeve is moved into driving connection with the gear.

13. Apparatus for effecting a driving connection between a pair of toothed elements rotatable with respect to each other about a common axis, one of the elements being movable along said axis into toothed engagement with the other element, comprising: a friction synchronizing clutch between said elements; a fluid pressure operated shift rod; a shift fork mounted on said shift rod for movement therewith; friction clutch operating means movable with respect to said shift rod and mounted for operating said friction clutch; actuating means between said shift rod and said operating means and movable between a first position wherein it connects said shift rod to said operating means so that said clutch is applied and further movement of said shift rod is blocked and a second position wherein said shift rod is movable with respect to said operating means; timing means for moving said actuating means from its first to its second position a predetermined time after initiation of the operation thereof; means responsive to a predetermined movement of said shift rod for initiating operation of said timing means whereby said shift rod is moved a predetermined distance with said actuating means in said first position to thereby effect operation of said synchronizing clutch and after a predetermined time said actuating means is moved into its second position and said toothed elements are brought into engagement.

14. Apparatus for effecting a driving connection between a pair of toothed elements rotatable with respect to each other about a common axis, one of the elements being movable along said axis into toothed engagement with the other element, comprising: a friction synchronizing clutch between said elements; a shift rod and power means for operating same; a shift fork mounted on said shift rod for movement therewith; friction clutch operating means; actuating means between said shift rod and said operating means and movable between a first position wherein it enables said clutch to be applied while said toothed elements are held out of engagement and a second position wherein said clutch is disengaged and said toothed elements are capable of moving into engagement; timing means for moving said actuating means from its first to its second position a predetermined time after initiation of the operation thereof; means operable in timed relation to movement of said shift rod for initiating operation of said timing means whereby said shift rod is moved a predetermined distance with said actuating means in said first position to thereby effect operation of said synchronizing clutch and after a predetermined time said actuating means is moved into its second position and said toothed elements are brought into engagement.

15. Apparatus for effecting a driving connection between a pair of toothed elements rotatable with respect to each other about a common axis, one of said elements being movable along said axis into engagement with the other element, comprising:
  synchronizing means for effecting synchronism of the toothed elements; power operated means for moving said one element along said axis toward the other element for engaging the synchronizing means;
  fluid pressure operated timing means for timing the period of the engagement of the synchronizing means;
  means responsive to said movement of said one element for supplying fluid pressure to said timing means; and
  means operable in response to the operation of said timing means and effective at a selected time after operation of said timing means for terminating operation of said synchronizing means and enabling said power operated means to move said one element into engagement with said other element.

16. An apparatus according to claim 15, including:
  a shift rod connected to said one element for effecting axial movement thereof;
  valve means connected to said timing means for controlling the supply of fluid pressure to said timing means;
  valve actuating means responsive to movement of said shift rod for actuating said valve so that fluid pressure is supplied to said valve in response to the position of said shift rod; and
  means operable in response to the position of said shift rod for operating said synchronizing means.

17. An apparatus according to claim 15, including:
  a shift rod connected to said one element for effecting axial movement thereof;
  fluid pressure cylinder means associated with said shift rod for effecting movement thereof;
  valve means operable in response to the positioning of said shift rod in a selected position;
  said timing means comprising chamber means connected to said valve means for having fluid pressure supplied thereto when said shift rod is in said position; and
  wherein said means for terminating operation of said synchronizing means and enabling engagement of said elements is operably associated with said chamber means and is operated when said chamber means becomes substantially fully pressurized.

18. An apparatus for effecting alternately a driving engagement between one of a pair of toothed elements and a third toothed element located between said pair, all of said toothed elements being rotatable about a common axis, said third element being movable alternately in opposite directions along said axis toward one and away from the other of said pair for effecting such engagement, comprising:
  synchronizing means for effecting synchronization of the elements about to be engaged;
  power means for moving said third element from engagement with one of said pair of elements into engagement with the other thereof, said power means including a shift rod connected to said third element;

fluid pressure cylinder means associated with said shift rod for effecting movement thereof and valve means operable in response to the positioning of said shift rod in a selected position;

timing means comprising chamber means connected to said valve means for having fluid pressure supplied thereto when said shift rod is in said position;

means for initiating operation of said timing means at a predetermined time with respect to entry of said third element into neutral position wherein it is out of engagement with both of said pair of elements;

means for operating said synchronizing means during at least a determinable portion of the time during which the timing means is operating; and means disposed within said chamber means and operated when said chamber means is fully pressurized for terminating operation of said synchronizing means and effecting engagement of said third element with said other element of said pair of elements.

References Cited in the file of this patent

UNITED STATES PATENTS

| | | |
|---|---|---|
| 2,014,486 | Vincent | Sept. 17, 1935 |
| 2,065,224 | Hladik | Dec. 22, 1936 |
| 2,263,141 | Peterson | Nov. 18, 1941 |
| 2,633,955 | Allen et al. | Apr. 7, 1953 |
| 2,706,027 | Ragland | Apr. 12, 1955 |
| 2,962,141 | Rudisch | Nov. 29, 1960 |

FOREIGN PATENTS

| | | |
|---|---|---|
| 426,750 | Germany | Mar. 16, 1926 |
| 606,480 | Germany | Dec. 3, 1934 |
| 334,834 | Italy | Jan. 30, 1936 |
| 654,701 | Great Britain | June 27, 1951 |
| 761,411 | Great Britain | Nov. 14, 1956 |